Sept. 9, 1969  A. E. SNOWDON  3,466,476
ELECTRIC STEPPING MOTOR WITH A PAIR OF ROTOR CAGES AND STATORS
Filed March 21, 1967
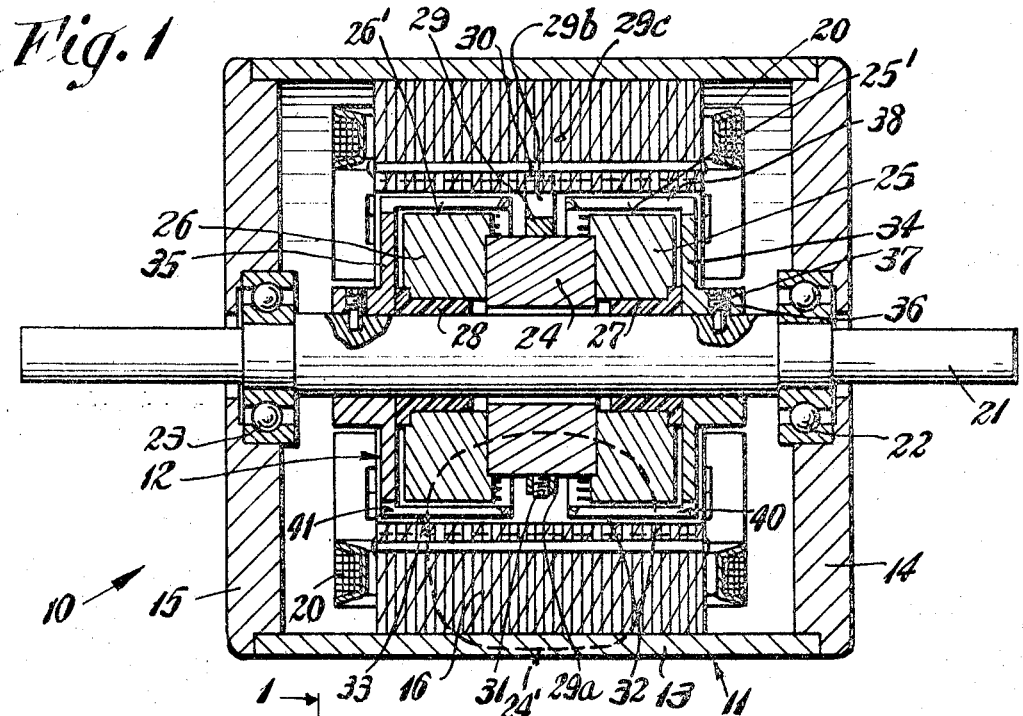
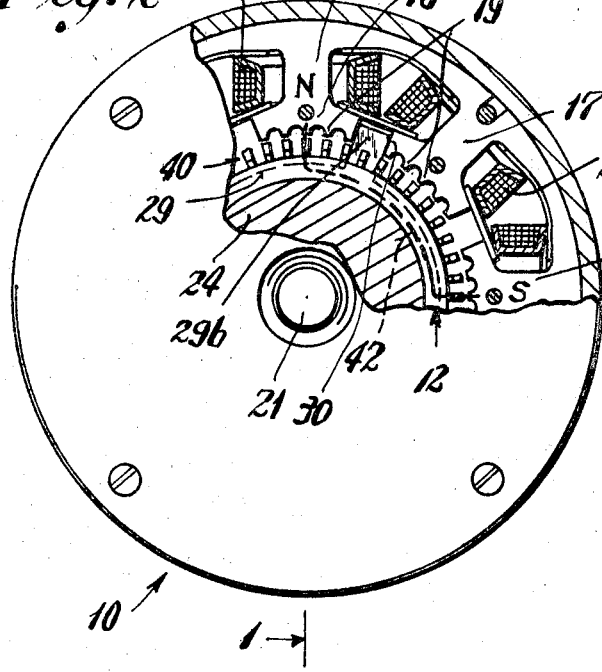
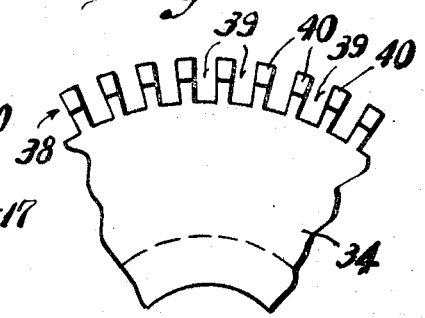
INVENTOR.
Arthur E. Snowdon
BY
Johnson and Kline
ATTORNEYS

United States Patent Office 3,466,476
Patented Sept. 9, 1969

3,466,476
ELECTRIC STEPPING MOTOR WITH A PAIR OF ROTOR CAGES AND STATORS
Arthur E. Snowdon, Bristol, Conn., assignor to The Superior Electric Company, Bristol, Conn., a corporation of Connecticut
Filed Mar. 21, 1967, Ser. No. 624,748
Int. Cl. H02k 37/00
U.S. Cl. 310—49                            7 Claims

ABSTRACT OF THE DISCLOSURE

A stepping motor having an outer stator formed with teeth that cooperate with teeth formed on a pair of rotor cages, the latter rotating in synchronism with the change of flux in the stator. The rotor teeth are magnetized by a permanent magnet means forming part of the stator that is held stationary with respect to the rotors to thereby increase the torque to inertia ratio of the motor.

---

In U.S. Patents Nos. Re. 25,445 and 2,931,929 there are disclosed stepping motors to which the present invention relates and which patents are owned by the assignee of the present invention. The motor depends on the interaction of a changeable stator flux created by energizing windings in the stator and a permanent flux created in the rotor by a permanent magnet. Both the stator and the rotor are toothed and each change of energization of the stator flux advances the rotor an incremental step related to the number of rotor teeth. The stator flux may be produced by energizing the windings with either A.C. or by phase switched D.C. so that with either manner of energization, the magnetic polarity of at least some of the stator teeth are changed for each change of energization.

In the heretofore known motors of this type as exemplified in the above-noted patents, there are limitations on the performance characteristics of the motor. Such characteristics include the speed and torque at which the motor may start, the degree of oscillation at the end of a step of the rotor, the operating stepping rate or speed, etc. While the heretofore suggested motors have satisfactory characteristics, it has been found that the desirable characteristics may be increased and the undesirable characteristics, e.g. oscillation of the rotor, may be decreased by reducing the mass and hence inertia of the rotor while maintaining essentially constant the torque producing capabilities of the rotor. The torque to inertia ratio of the rotor is thus increased, which in turn provides an improvement in the performance characteristics of the motor by having the rotor more responsive to the stator flux.

It is accordingly an object of the present invention to provide a stepping motor which has a stator that includes a stationary magnet means for increasing the torque to inertia ratio of the rotor.

Another object of the present invention is to be able to achieve the above object with only minor structural changes in such a motor and in which the changes may be as economically made.

A further object of the present invention is to provide a stepping motor that substantially acts in the same manner as heretofore known motors but yet in which the weight and inertia of the rotating parts are substantially decreased.

In carrying out the present invention, the stepping motor has a stator that is substantially identical to the stator in the above-noted patents. Such a stator includes a plurality of poles with each pole having an inner periphery that is formed to provide axially extending teeth. A winding is inductively associated with each pole and by energizing the windings in the proper sequence, the polarity of the magnetic flux of the poles may be altered to produce the magnetic polarity sequence of each that is required for rotation of the rotor.

The rotor includes a shaft on which are secured a pair of spaced apart annular cages that rotate with the shaft. The cages have a cylindrical flange that is segmented to effectively form longitudinally, i.e. axially, extending teeth and by being formed of low reluctance magnetic material form a low reluctance path for the passage of magnetic flux. Located between the cages and concentric on the shaft but stationary with respect to the shaft to form in effect an inner stator, is a permanent magnet means that includes an axially polarized permanent magnet with an end cap abutting each end. The teeth of each cage are positioned between the teeth of the poles and the circular periphery of the end caps to rotate in the annular gap between the end caps and the stator. The flux of the permanent magnet means and the stator flux thus tend to follow a low reluctance path that is through the cage teeth and the interaction thereof produces the torque of the motor. However, as the permanent magnet means is restrained against rotation only the shaft and cages are rotated by the torque and the mass of the permanent magnet is not part of the rotor mass or inertia while still providing the quantity of flux.

Other features and advantages will hereinafter appear.

In the drawing:

FIG. 1 is an axial section of the motor of the present invention taken on the line 1—1 of FIG. 2.

FIG. 2 is an end view, with portions broken away to show interior structure.

FIG. 3 is a front view of a portion of a rotor cage.

Referring to the drawing, the motor of the present invention is generally indicated by the reference numeral 10 and includes a stator 11 that supports a rotor 12. The stator is formed from a metal tube 13 that has a pair of end bells 14 and 15 secured at either end. Fixed to the interior of the tube 13, as by a press fit, is a pole forming member 16 that is made from laminations of paramagnetic material such as sheet iron secured together. The laminations are shaped to define a plurality of poles 17 which are circularly evenly spaced about the axis of the motor. Each pole includes an arcuate periphery 18 on which evenly spaced axially extending teeth 19 are formed. A winding 20 circumscribes each pole and by energization of the winding the magnetic polarity of the pole may be made to be of the one or the other magnetic polarity.

The rotor 12 includes a shaft 21 that is mounted on ball bearings 22 and 23 secured on the end bells 14 and 15 respectively for rotation with respect to the stator. Concentric with the axis of the shaft 21 within the interior of the motor to form an inner stator is a permanent magnet means that includes a permanent magnet 24 and end caps 25 and 26 with the latter being abutted against the ends of the magnet 24 and secured thereto as by a press fit on the periphery of the magnet. Each of the end caps 25 and 26 is annual and has a cylindrical periphery 25' and 26' respectively. The magnet 24 and end caps 25 and 26 are rotatably supported on the shaft 21 by a pair of flanged bearings 27 and 28 that supports the permanent magnet means axially of the stator but enables the shaft to rotate with respect thereto.

In order to prevent rotation of the permanent magnet means, a restraining means 29 secures the permanent magnet means to the pole forming member of the stator. While any desired restraining means may be employed, in the herein disclosed specfic embodiment of the invention, it includes a ring 29a having a finger 29b that enters into a slot 29c formed between two poles 17. The ring of the restraining means may be secured to the magnet 24 in any desired manner as by a set screw 31.

The cylindrical peripheries 25' and 26' of the end caps, while concentric on the shaft, are axially spaced from each other and the pole forming member 16 is of sufficient length that the peripheries are radially aligned to have separate portions of the pole forming member radially aligned with the peripheries to define air gaps 32 and 33 therebetween. Positioned within each gap is a portion of rotor cages 34 and 35. Each rotor cage, referring to the rotor cage 34, has a hub 36 which includes a set screw 37 that secures the cage to the shaft 21, though other securing means may be employed if desired. Integral with the hub is an axially extending annular flange portion 38 in which equally spaced slots 39 are cut to form teeth 40. Only the teeth of the cages extend into the air gaps 32 and 33.

With the above structure it will be appreciated that the permanent magnet means is prevented from rotation while torque exerted on the teeth 40 of the rotor cages is transmitted to the shaft to effect rotational movement thereof. For creating the driving torque on the teeth 40 the permanent magnet 24 is polarized axially to cause the cylindrical periphery of the end caps to be oppositely magnetized such as the surface 25' being a North pole and the surface 26' being a South pole. The lowest reluctance path for the permanent magnet flux is thus through the end cap 25, the teeth 40, the pole forming member 16 and/or tubing 13, the teeth 41 of the cage 35 and the end cap 26 as shown by the dotted line 24'.

The motor, when operated, requires energization of the windings 20 of the stator in special manner and one such manner of energization has one pole be an N pole, as indicated by the reference character N and a once removed pole be a South pole, such as indicated by the reference character S. The stator magnetic flux produced by the poles thus flows in a low reluctance path that, as to the gap 32, includes the teeth of the N pole, the teeth 40 adjacent the N pole, the end cap 25, the teeth 40 adjacent the S pole and N pole. Such a path is indicated by the dotted line 42. The interaction of the two fluxes on the teeth 40 and 41 will accordingly tend to produce torque to rotate the shaft.

In accordance with the present invention, the end caps 25 and 26 are made of a low reluctance material as for example sintered iron. The rotor cages 34 and 35 are also made of low reluctance material, such as annealed cold rolled steel or sintered iron as are the tube 13 and the pole forming member 16. The flux path for both the flux of the permanent magnet means and the flux produced by the stator will accordingly traverse a path which has the lower reluctance and such paths are as heretofore described.

The bearings 27 and 28 have flanges which serve to locate the permanent magnet means with respect to the rotor cages and prevent axial movement thereof along the shaft. The bearings may be formed of conventional bearing material such as polytetrafluoroethylene or a copper containing metal.

While there has been disclosed in the specific embodiment a permanent magnet such as formed from "Alnico" material, it will also be understood that the present invention contemplates the use of a D.C. energized winding as another magnet means for providing a source of substantially constant, unidirectional magnetic flux.

It will accordingly be appreciated that there has been disclosed an electric motor that includes a stator having tooth forming poles and a permanent magnet means. The motor functions as a stepping motor by the utilization of a pair of rotor cages that have teeth which are positioned between the pole teeth at the cages outer peripheries and the permanent magnet means at the cages inner peripheries. The flux produced by the stator and the permanent magnet means flux both traverse a path that includes teeth of the cages. With energization of the stator the cage teeth are caused to be moved into the position which produces the path of lowest reluctance and such movement is delivered to the output shaft of the motor. By the present invention, the inertia of the rotor is substantially reduced by forming the permanent magnet means as part of the stator and preventing it from rotating with the shaft thereby lessening the mass of the rotor and hence the torque required to start and stop the rotor for each step that the output shaft is caused to move.

Variations and modifications may be made within the scope of the claims and portions of the improvements may be used without others.

I claim:

1. An electric motor of the stepping type comprising a stator having a plurality of circularly disposed inwardly projecting poles, each of said poles having an arcuate periphery formed with axially extending teeth and a winding inductively associated therewith; a rotor cooperating with the stator, said rotor including a shaft; means mounting the shaft concentrically with the stator for rotation with respect thereto; an inner stator including a magnet means rotatably supported on the shaft having portions disposed to be axially aligned with the poles and having means for restraining the magnet from rotating with the shaft; and in which said rotor has a rotor cage secured on the shaft and having annularly disposed, axially extending teeth, said teeth being positioned in the gap between the poles and the portion of the magnet means aligned with the poles.

2. The invention as defined in claim 1 in which the magnet means has two spaced portions aligned with the poles, and there are two rotor cages secured on the shaft in spaced apart relation, the teeth of one rotor cage being between one aligned portion and the poles and the teeth of the other rotor cage being between the other aligned portion and the poles.

3. The invention as defined in claim 2 in which the magnet means is positioned between the rotor cages and means spacing the rotor cages from the magnet means to form an air gap therebetween.

4. The invention as defined in claim 2 in which the magnet means includes a permanent magnet polarized axially, and in which one portion has one magnetic polarity and the other portion the other magnetic polarity.

5. The invention as defined in claim 4 in which each portion is formed of a disk-shaped end cap of low reluctance material, and in which an end cap is positioned against each end of the magnet.

6. The invention as defined in claim 1 in which the magnetic flux from one pole is attached to another pole, and in which the low reluctance path of the pole flux includes teeth of the rotor cage and the portion of the magnet means.

7. The invention as defined in claim 1 in which there is a low reluctance path for the flux of magnet means, said path including the teeth of one cage, the stator and the teeth of the other cage.

References Cited

UNITED STATES PATENTS

| | | | |
|---|---|---|---|
| 2,159,768 | 5/1939 | MacMillan | 310—152 |
| 2,428,327 | 9/1947 | Fuge | 310—49 |
| 2,931,929 | 4/1960 | Snowdon et al. | 310—156 |
| 2,982,872 | 5/1961 | Fredrickson | 310—163 |
| 3,206,623 | 9/1965 | Snowdon | 310—162 |
| 3,248,584 | 4/1966 | Knaver | 310—266 X |

WARREN E. RAY, Primary Examiner

U.S. Cl. X.R.

310—67, 154, 266